(12) United States Patent
Poton

(10) Patent No.: US 9,744,947 B2
(45) Date of Patent: Aug. 29, 2017

(54) CONNECTOR BETWEEN A WIPER BLADE AND A DRIVE ARM

(71) Applicant: Valeo Systèmes d'Essuyage, Le Mesnil Saint Denis (FR)

(72) Inventor: Eric Poton, Pont du Chateau (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 14/786,609

(22) PCT Filed: Apr. 16, 2014

(86) PCT No.: PCT/EP2014/057831
§ 371 (c)(1),
(2) Date: Oct. 23, 2015

(87) PCT Pub. No.: WO2014/173784
PCT Pub. Date: Oct. 30, 2014

(65) Prior Publication Data
US 2016/0059829 A1    Mar. 3, 2016

(30) Foreign Application Priority Data
Apr. 24, 2013  (FR) ..................................... 13 53734

(51) Int. Cl.
*B60S 1/40*      (2006.01)
*B60S 1/38*      (2006.01)

(52) U.S. Cl.
CPC ........... *B60S 1/4016* (2013.01); *B60S 1/3849* (2013.01); *B60S 1/4009* (2013.01); *B60S 1/3806* (2013.01); *B60S 2001/4022* (2013.01)

(58) Field of Classification Search
CPC .... B60S 1/4006; B60S 1/4009; B60S 1/3849; B60S 1/4016; B60S 2001/4022; B60S 2001/4035

(Continued)

(56) References Cited

U.S. PATENT DOCUMENTS

2010/0275402 A1    11/2010  Espinasse

FOREIGN PATENT DOCUMENTS

CN    101213120 A    7/2008
JP    2002308063 A   10/2002

(Continued)

OTHER PUBLICATIONS

International Search Report issued in corresponding application No. PCT/EP2014/057831 mailed on Jun. 25, 2014 (2 pages).

(Continued)

*Primary Examiner* — Gary Graham
(74) *Attorney, Agent, or Firm* — Osha Liang LLP

(57) ABSTRACT

The invention relates to a connector (1) for a windscreen-wiper blade (2), said connector (1) being configured such as to engage with an adapter (3) for enabling a connection between said blade (2) and a drive arm, said connector (1) including a body (10) and a cover (30) which is movable on said body (10) along a hinge axis (X), said cover (30) including at least one means (31) for hinging on said body (10) and at least one first slot (32), said one or more first slots (32) being located on one or more side portions (33) of said cover (30) such as to form flexible areas (42), said one or more flexible areas (42) including the one or more hinging means (31). The invention also relates to an attachment device including an adapter (3) and a connector (1) such as previously described. The invention further relates to a windscreen-wiper blade (2) including such an attachment device. The invention finally relates to a wiping system including such a windscreen-wiper blade.

16 Claims, 2 Drawing Sheets

Figure 1:
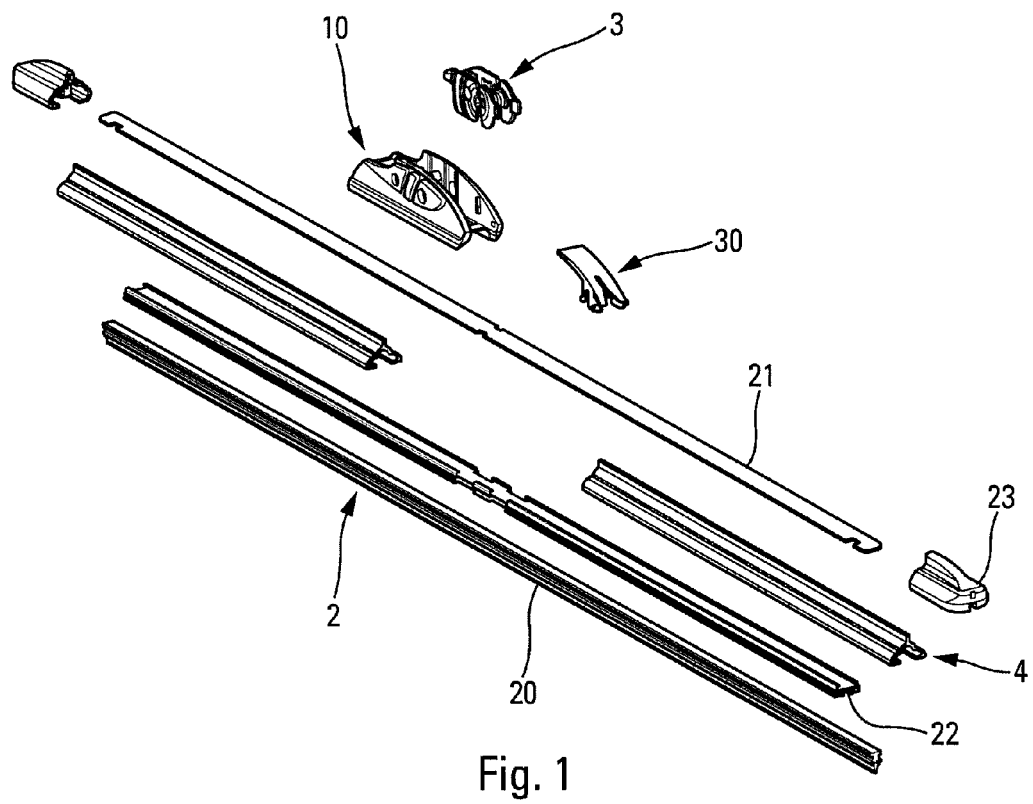

(58) Field of Classification Search
USPC .................................................... 15/250.32
See application file for complete search history.

(56) References Cited

FOREIGN PATENT DOCUMENTS

| | | | |
|---|---|---|---|
| JP | 2007-253924 | * | 10/2007 |
| KR | 101287466 B1 | | 7/2013 |
| WO | 2007/142390 A1 | | 12/2007 |
| WO | 2012/090635 A1 | | 7/2012 |

OTHER PUBLICATIONS

French Search Report issued in corresponding application No. FR1353734 dated Jan. 13, 2014 (1 page).
Office Action issued in corresponding Chinese Patent Application No. 201480028060.2, mailed on Dec. 30, 2016 (18 pages).

\* cited by examiner

CONNECTOR BETWEEN A WIPER BLADE AND A DRIVE ARM

The subject matter of the present invention comprises a windshield-wiper blade connector, a fixing device between a windshield-wiper blade and a drive arm, a windshield-wiper blade and a wiping system comprising such a connector.

Motor vehicles are routinely equipped with wiping systems for washing the windshield and preventing the driver's view of the environment from being disturbed. These windshield wipers are conventionally driven by arms or blade-carriers effecting an angular to-and-fro movement and include elongate blades themselves carrying squeegees made from an elastic material. These squeegees rub against the windshield and evacuate water from the driver's field of view. The blades take the form either, in a conventional version, of articulated swing-arms that hold the squeegee at a number of discrete locations or, in a more recent, so-called "flat blade" version, a semi-rigid assembly that retains the squeegee over its entire length.

There are known in particular hook-type arms with a front longitudinal end curved in a U-shape so as to engage around a central core of complementary shape between two flanks of the connector. In this regard, it is known to use a fixing device comprising a connector intended to be fixed to the structure of the blade and an adapter that can be coupled on the one hand to the connector via a mobile connection and on the other hand to the arm in a direction substantially parallel to the body of the wiper.

Locking means are usually provided so as to be able to guarantee that the arm and in particular its end is immobilized in position on the adapter and therefore to guarantee perfect coupling between the arm and the blade. These means generally comprise one or more elastically deformable immobilizing members that exert their action directly on the end of the arm.

However, in use, it appears important to avoid any risk of disengagement of the wiper relative to the arm while operating. This is why the locking means further comprise a retaining member that is mounted so as to be either mobile or removable and that once in place is adapted to prevent any unwanted movement. This member traditionally takes the form of an articulated flap, cover or tongue on the connector. However, there exists a requirement to improve and/or to develop the solutions already known.

To this end, the invention concerns a connector for a windshield-wiper blade, said connector being configured to co-operate, in particular pivotally, with at least one adapter for enabling a connection between said blade and a drive arm, said connector including at least one body and at least one cover mobile on said body about an articulation axis, said cover comprising at least one articulation means on said body and at least one first slot, said first slot(s) being situated on one or more lateral parts of said cover so as to form at least one flexible area, the flexible area(s) comprising the articulation means.

The location of said first slots therefore allows flexing of at least one area of the lateral part(s) of the body where the articulation means are located. The presence of these first slots notably facilitates fitting and/or removing the cover and consequently reduces the risk of breaking the cover and/or the body of the connector.

In accordance with various embodiments of the invention, taken in combination or separately:

said cover is configured to conceal at least in part a housing defined by said connector to receive said adapter and/or to immobilize said arm in a nominal operating position, said first slot(s) extend(s) transversally to the articulation, said first slot(s) follow an upper face of said cover, said upper face comprises at least one second slot perpendicular to said articulation axis and configured for the passage of a deflector of the windshield-wiper blade, said second slot is flared at its base, said second slot is centered on said upper face relative to the articulation axis, said articulation means comprise at least one pin adapted to be accommodated inside orifices in the body of said connector, said pin(s) are configured to allow rotation of said cover relative to said body about said articulation axis, said pin(s) are situated at the level of said flexible area(s), said cover comprises at least one means for locking said cover to said body, said locking means comprise at least one flexible tongue comprising a hook adapted to retain said cover in the position locked onto said body, said hook is part of said cover, said lateral part(s) comprise(s) a third slot separating at least said flexible area(s) and at least said flexible tongue(s), said lateral part(s) comprise(s) a portion defining at least one hinge for flexing of said flexible area(s) between at least one end of said first slot and at least one end of said third slot, said cover is able to abut on one or more ribs located on at least one lateral flank of said connector, said hook(s) of the locking means are configured to bear on said rib(s), said rib or ribs is or are perpendicular to the longitudinal axis of the connector, said body of the connector comprises a pivot pin configured to allow pivoting of said adapter relative to said connector, the axis about which said cover is articulated to said body is substantially parallel to the axis about which said adapter pivots relative to said connector, the axis about which said cover is articulated to said body is transverse to the longitudinal axis of the connector.

The invention also concerns a fixing device comprising an adapter and a connector as described above.

The invention further concerns a windshield-wiper blade comprising such a fixing device.

The invention finally concerns a wiping system comprising such a windshield-wiper blade.

The invention will be better understood, and other objects, details, features and advantages thereof will become clearer in the course of the following detailed explanatory description of at least one embodiment of the invention given by way of purely illustrative and non-limiting example with reference to the appended diagrammatic drawings.

Figure 2:
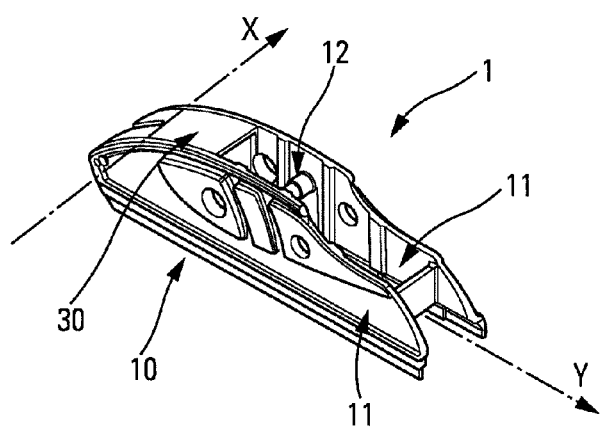
Figure 3:
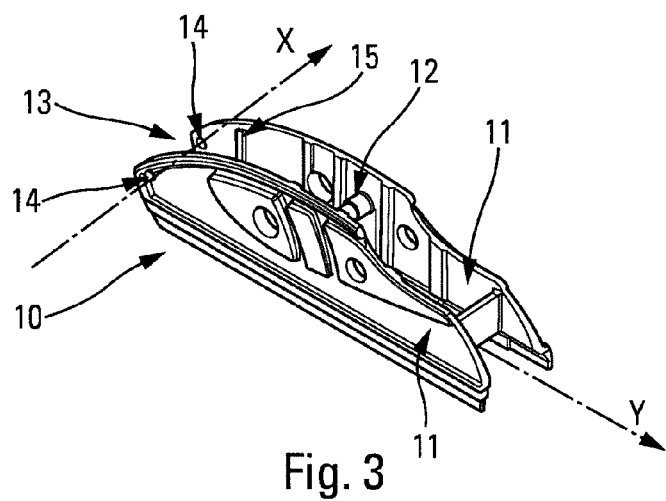
Figure 4:
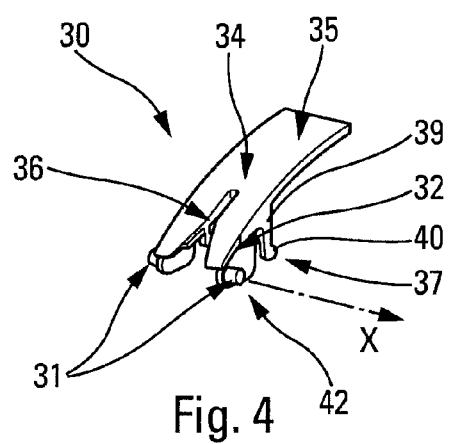
Figure 5:
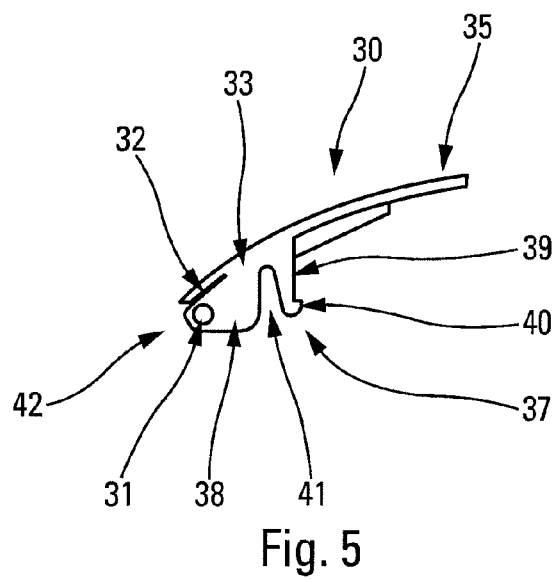

In these drawings:

FIG. 1 is an exploded view of a windshield-wiper comprising a connector in accordance with the invention, FIG. 2 is a perspective view of a connector for a windshield-wiper blade in accordance with the invention, FIG. 3 is a perspective view of the body of the connector seen in FIG. 2, FIG. 4 is a perspective view of the cover seen in FIG. 2, FIG. 5 is a side view of the cover seen in FIG. 2.

Referring to FIG. 1, the invention concerns a connector 1 for a windshield-wiper blade 2 configured to co-operate, in particular pivotally, with an adapter 3 for connecting said blade 2 and a drive arm that is not shown.

Here said blade 2 is a flat blade. For example, it comprises a squeegee 20 and at least one curving spine 21 for pressing the squeegee against the windshield of the vehicle it equips. Here it further comprises a support armature 22 carrying said squeegee 20 and said spine 21. Said blade 2 could further include a deflector 4, for example carried by the armature 22. Said deflector 4 presses the blade against the windshield by virtue of the effect of the flow of air caused by the movement of the vehicle it equips. Here said blade 2 further comprises end fittings 23 longitudinally immobilizing said squeegee 20, said spine 21 and/or said deflector 4. Said connector 1 is fixed, notably crimped, to said blade 2, in particular to said armature 22.

As shown in FIGS. 1 and 2, said connector 1 comprises a body 10 and a cover 30. The cover 30 is mobile on said body 10 about an articulation axis. Said articulation axis is represented by the axis X in FIGS. 2 to 4. The cover 30 comprises at least one means 31 for articulating it on said body 10. The articulation means 31 enable fixing of the cover 30 to the body 10 of the connector 1 but allow the cover 30 to move on said body 10.

In accordance with the invention, the cover 30 also comprises at least one first slot 32. Said first slot(s) 32 is or are situated on one or more lateral parts 33 of said cover 30 so as to form at least one flexible area 42, said flexible area(s) 42 comprising the articulation means 31. Transverse flexing produced by pinching the lateral parts 33 therefore enables fitting of said cover 30 to said body 10 and its removal therefrom.

The connector 1 shown in FIG. 1 includes a body 10 that has two lateral flanks 11 that support a transverse pivot pin 12 allowing the blade 2 to pivot on the arm. The body 10 is therefore H-shaped at the location of the pivot pin 12, over which the adapter 3 can be nested and on which it can move. The body 10 of the connector also includes a front opening 13 enabling engagement and disengagement of a drive arm, for example, such as a hook-shaped arm. The lateral flanks 11 are intended to conceal the adapter 3 and/or part of the drive arm.

Said cover 30 enables concealment of at least part of a housing defined by said connector 1 for engagement and/or disengagement of the arm at the level of said front opening 13 and/or for immobilization of said arm in a nominal operating position. In other words, the cover 30 advantageously makes it possible to guarantee the immobilization of the arm, notably its end, in position on the adapter 3 and therefore perfect coupling between the arm and the blade 2. This avoids all risk of disengagement of the blade 2 relative to the arm when in operation.

The cover 30 shown in FIGS. 1, 2 and 4 comprises, in addition to the two lateral parts 33, an upper face 34 that follows the curvature of the body 10 of the connector 1. The upper face 34 comprises a holding area 35 situated at the level of a distal end referred to the articulation axis X. This area 35 makes it possible to open and to close the cover 30 and preferably makes it possible to engage or to disengage the drive arm or to place the arm in the immobilized position in the nominal operating position.

Each lateral part 33 comprises one of said first slots 32 that extends transversally to the articulation axis X of the connector. In this embodiment, the two slots 32 follow the curvature of the upper face 34.

The cover 30 also comprises a second slot 36 perpendicular to the articulation axis X of the cover 30 and situated at a proximal end of the upper face 34 referred to said articulation axis X. The slot 36 is configured for the passage of the deflector 4 of the blade 2. In this embodiment, the slot 36 is flared at the base and is centered on the upper face 34 relative to the articulation axis X. It therefore facilitates introducing the deflector 4, which here is of the centered type. To be more precise, it makes it possible to open the cover 30 entirely to allow engagement and disengagement of a drive arm despite the presence of the deflector 4. Compared to designs suitable for a non-centered deflector, the second slot 36 of which would not be centered and where one of the lateral parts 33 has increased flexibility while the other loses some flexibility, fitting the cover 30 to the body 10 of the connector and/or removing it therefrom is then more difficult. This is why, in this example of a design suitable for a centered type deflector 4, it is all the more advantageous to add first slots 32 to allow improved flexing of the lateral parts 33 of the cover 30 and to facilitate fitting it to the body 10 of the connector 1 and/or removing it therefrom.

In accordance with the embodiment shown, the articulation means of the cover 30 are pins 31 that fit into orifices 14 in the body 10 of the connector 1. The pins 31 are configured to allow rotation of the cover 30 relative to said body 10 about the articulation axis X and to go from an open position to a closed, so-called immobilized position of the cover 30. In this embodiment, the pins 31 are of cylindrical shape. It is of course possible to use any other shape provided that it matches the shape of the orifices 14 in the body 10 of the connector and that the pins can fit in the latter orifices and allow rotation of the cover 30.

Here the cover 30 comprises locking means 37 so as to be able to immobilize the cover 30 in the immobilized position and thereby prevent all risk of disengagement of the drive arm. The locking means 37 are situated on the lateral parts 33 of the cover 30 and notably on lateral lugs 38. Here they are represented by flexible tongues 39 comprising a respective hook 40 that is part of the cover 30. The hook 40 is adapted to retain the cover 30 in the immobilized position of the body 10 of the connector 1. In fact, the hooks 40 come to bear on ribs 15 situated on the interior of the lateral flanks 11 of the body 10 of the connector 1 and perpendicular to the longitudinal axis Y of said connector 1. The hooks 40 are then immobilized and prevent the cover 30 returning to the open position unless acted on by a user. The ribs 15 also serve as abutments for the cover 30 when it is in the immobilized position.

To facilitate locking the cover 30 to the body 10 and unlocking it therefrom, each lateral part 33 of the cover 30 comprises a third slot 41 that separates the flexible tongues 39 and the flexible areas 42 carrying the pins 31. The hook 40 is therefore more flexible so that it can be engaged on the body 10 of the connector in the immobilized position or disengaged and thus allow opening of the cover 30.

The end of the third slot 41 also defines with the end of the first slot 32 a hinge for flexing of the flexible area 42 carrying the cylindrical pins 31. The system of three slots 32, 36 and 41 therefore enables easier fitting of the cover 30 to the body 10 and/or removal therefrom with a lower risk of breakage.

It is to be noted that alternative embodiments are of course possible and that the present invention is not limited to a connector intended for a flat blade and a deflector of the centered type, both configured to be mounted on a drive arm having a hook-type end. It is notably possible to extend the present invention to other types of connectors intended for different blades, deflectors and/or drive arms.

The invention claimed is:

1. A connector elongated to define a longitudinal axis, said connector being for a windshield-wiper blade configured to co-operate with at least one adapter for enabling a connection between said blade and a drive arm, said connector comprising:
at least one body; and
at least one cover mobile on said body about at least one articulation axis,
said cover comprising:
at least one articulation means on said body,
an upper face that follows a curvature of said body, and
at least one first slot, said at least one first slot being situated on one or more lateral parts of said cover to form at least one flexible area, the at least one flexible area comprising the articulation means,
wherein said upper face is configured to abut one or more ribs located on at least one lateral flank of said connector said one or more ribs extending along the flank perpendicular to the longitudinal axis of the connector.

2. The connector as claimed in claim 1, wherein said at least one first slot extends transversely to the articulation.

3. The connector as claimed in claim 1, wherein said upper face of said cover comprises at least one second slot perpendicular to said articulation axis and configured for the passage of a deflector of the windshield-wiper blade.

4. The connector as claimed in claim 3, wherein said second slot is flared at its base.

5. The connector as claimed in claim 3, wherein said second slot is centered on said upper face relative to the articulation axis.

6. The connector as claimed in claim 1, wherein the articulation means comprise at least one phi situated at the level of the flexible areas, the pins being adapted to fit into respective orifices in the body of said connector, the pin(s) being configured to allow rotation of said cover relative to said body about said articulation axis.

7. The connector as claimed in claim 1, wherein said cover comprises at least one means for locking said cover to said body.

8. The connector as claimed in claim 7, wherein the upper face of the cover further comprises a holding area configured to open and to close the cover, and wherein said holding area extends beyond said at least one means for locking said cover to said body.

9. A fixing device comprising an adapter and a connector as defined in claim 1.

10. A windshield-wiper blade comprising a fixing device as defined in claim 9.

11. A wiping system comprising a windshield-wiper blade as defined in claim 10.

12. A connector elongated to define a longitudinal axis, said connector being for windshield-wiper blade configured to co-operate with at least one adapter for enabling a connection between said blade and a drive arm, said connector comprising:
at least one body; and
at least one cover mobile on said body about at least one articulation axis,
said cover comprising at least one articulation means on said body and at least one first slot, said at least one first slot being situated on one or more lateral parts of said cover to form at least one flexible area, the at least one flexible area comprising the articulation means,
wherein said cover comprises at least one means for locking said cover to said body,
wherein said locking means comprise at least one flexible tongue comprising a hook that comes to bear on ribs located on at least one lateral flank of said connector, said ribs extending along the flank perpendicular to the longitudinal axis of the connector and configured to retain said cover in the immobilized position on said body, and
said connector being configured so that an upper face of said cover that follows a curvature of said body abuts the ribs.

13. The connector as claimed in claim 12, wherein at least one lateral part comprises a third slot separating at least one flexible area carrying the articulation means in a form of a pin and at least one flexible tongue.

14. The connector as claimed in claim 13, wherein said at least one lateral part comprises a portion defining a hinge for flexing of said flexible area between at least one end of said first slot and at least one end of said third slot.

15. The connector as claimed in claim 12, wherein each lateral part comprises a third slot separating the flexible areas carrying the articulation means in a form of pins and flexible tongues.

16. The connector as claimed in claim 12, wherein the upper face of the cover further comprises a holding area configured to open and to close the cover, and wherein said holding area extends beyond said at least one flexible tongue.

* * * * *